(12) United States Patent
Murakami

(10) Patent No.: US 8,413,774 B2
(45) Date of Patent: Apr. 9, 2013

(54) SHOCK ABSORBER

(75) Inventor: Hiroshi Murakami, Yokohama (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 337 days.

(21) Appl. No.: 12/963,739

(22) Filed: Dec. 9, 2010

(65) Prior Publication Data

US 2011/0147147 A1 Jun. 23, 2011

(30) Foreign Application Priority Data

Dec. 22, 2009 (JP) ................................. 2009-291189

(51) Int. Cl.
*F16F 9/34* (2006.01)
(52) U.S. Cl. ........... 188/322.13; 188/322.22; 188/282.2; 188/282.6
(58) Field of Classification Search ............... 188/322.2, 188/322.22, 282.5, 282.2, 282.6, 283, 283.1, 188/322.13
See application file for complete search history.

(56) References Cited

U.S. PATENT DOCUMENTS

| 6,860,370 | B2 * | 3/2005 | Nakadate | 188/282.5 |
| 7,743,896 | B2 * | 6/2010 | Vanhees et al. | 188/322.13 |
| 7,757,826 | B2 * | 7/2010 | Hayama et al. | 188/282.2 |

FOREIGN PATENT DOCUMENTS

| JP | 2006-10069 | 1/2006 |
| JP | 2009-243634 | 10/2009 |

* cited by examiner

*Primary Examiner* — Melanie Torres Williams
(74) *Attorney, Agent, or Firm* — Wenderoth, Lind & Ponack, L.L.P.

(57) ABSTRACT

The flow of hydraulic fluid induced by sliding movement of a piston in a cylinder is controlled by a pilot-type main valve and a pilot valve to generate damping force. The valve opening of the main valve is controlled by adjusting the pressure in a pilot chamber through the pilot valve. A volume compensating chamber is defined by a flexible disk member so as to face the pilot chamber. The volume compensating chamber is communicated with a reservoir through communicating passages. When the disk valve opens, the volumetric capacity of the pilot chamber reduces. At this time, the flexible disk member deflects toward the volume compensating chamber, thereby suppressing an excessive rise in pressure in the pilot chamber and preventing an unstable operation of the pilot valve and the main valve to obtain a stable damping force.

10 Claims, 5 Drawing Sheets

SHOCK ABSORBER

BACKGROUND OF THE INVENTION

The present invention relates to a shock absorber such as a hydraulic shock absorber that generates a damping force by controlling the flow of a fluid against the stroke of a piston rod.

In general, shock absorbers attached to the suspension systems of automobiles or other vehicles are arranged as follows. A piston connected with a piston rod is slidably fitted in a cylinder having a fluid sealed therein, and the flow of fluid induced by sliding movement of the piston in the cylinder is controlled by a damping force control mechanism, which comprises an orifice and a disk valve, to generate a damping force against the stroke of the piston rod.

In a hydraulic shock absorber disclosed in Japanese Patent Application Publication No. 2006-10069, for example, hack-pressure chamber (pilot chamber) is formed at the hack of a main disk valve serving as a damping force generating mechanism. A part of the flow of fluid is introduced into the back-pressure chamber to apply the pressure in the back-pressure chamber to the main disk valve in the direction for closing the valve, and the pressure in the back-pressure chamber is controlled by a pilot valve, thereby controlling the valve opening of the main disk valve. Thus, it is possible to increase the degree of freedom for adjusting damping force characteristics.

The shock absorber, in which the valve opening of the main valve is controlled by the pressure in the back-pressure chamber, as disclosed in Japanese Patent Application Publication No. 2006-10069, suffers, however, from the following less useful aspect. In the above-described shock absorber, when the main valve opens, the volumetric capacity of the back-pressure chamber reduces for structural reasons. Therefore, when the main valve opens, the pressure in the back-pressure chamber is likely to increase excessively, making it impossible to obtain desired damping force characteristics.

SUMMARY OF THE INVENTION

An object of the present invention is to provide a shock absorber capable of obtaining a desired damping force.

To solve the above-described problem, the present invention provides a shock absorber including a cylinder having a fluid sealed therein, a piston slidably fitted in the cylinder, and a piston rod connected at one end thereof to the piston. The other end of the piston rod extends to the outside of the cylinder. The shock absorber further includes a main valve generating a damping force by the flow of fluid induced by sliding movement of the piston, a pilot chamber applying the pressure therein to the main valve in a direction for closing the main valve, an inlet passage introducing the fluid into the pilot chamber, a pilot passage communicating between the pilot chamber and the downstream side of the main valve, and a pilot valve provided in the pilot passage to discharge the fluid from the pilot chamber. A partition member is provided in the pilot chamber to form a volume compensating chamber facing the pilot chamber across the partition member. The volume compensating chamber is communicated with the downstream side of the main valve.

The pilot valve may be a control valve actuated by a solenoid actuator.

The partition member may have a flexible disk member; the pilot chamber being formed by a cylindrical casing member having a bottom; the volume compensating chamber being defined by the flexible disk member seated on at least two annular seat portions projecting from inner and outer peripheral portions, respectively, of the bottom of the casing member;
a communicating passage being formed in the bottom of the casing member.

The flexible disk member may be clamped at an inner peripheral portion thereof by the seat portion projecting from the inner peripheral portion of the bottom of the casing member.

A stopper may be provided downstream of the flexible disk member to limit an amount of deflection of the flexible disk member.

A gas-bleeding flow path may be formable between the flexible disk member and the seat portion projecting from the outer peripheral portion of the bottom of the casing member; the gas-bleeding flow path allowing gas bubbles staying in the pilot chamber to move to the volume compensating chamber through the gas-bleeding flow path.

DETAILED DESCRIPTION OF THE INVENTION

One embodiment of the present invention will be explained below in detail with reference to the accompanying drawings.

Figure 2:
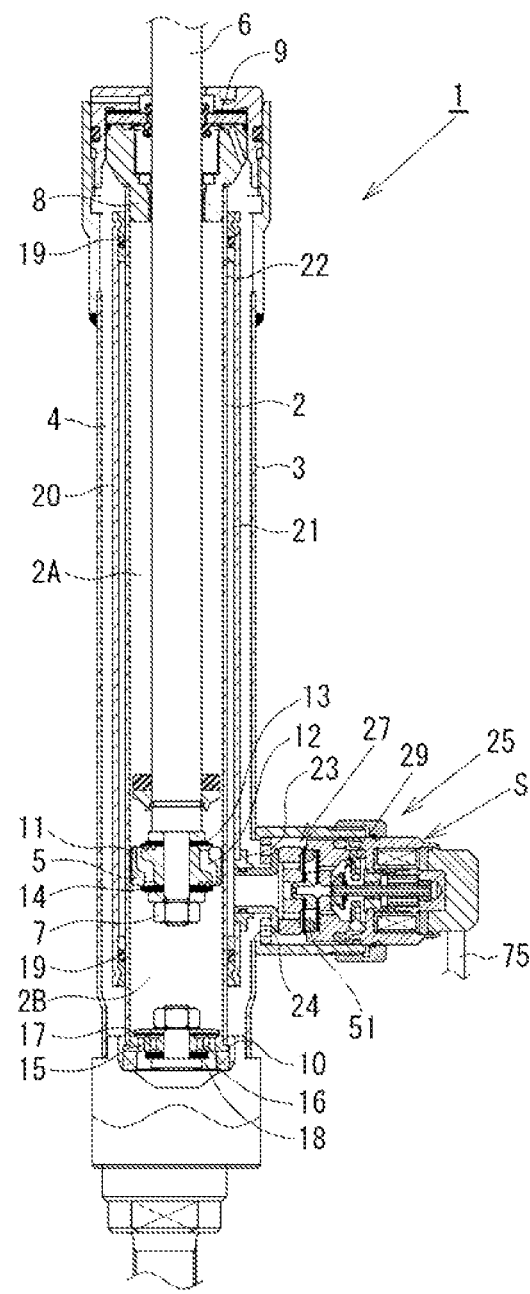
FIG. 2 is a longitudinal sectional view of the damping force control type shock absorber according to one embodiment of the present invention.

As shown in FIG. 2, a damping force control type shock absorber 1, which is a shock absorber according to this embodiment, has a dual-tube structure comprising a cylinder 2 and an outer tube 3 provided outside the cylinder 2. A reservoir 4 is formed between the cylinder 2 and the outer tube 3. A piston 5 is slidably fitted in the cylinder 2. The piston 5 divides the interior of the cylinder 2 into two chambers, i.e. a cylinder upper chamber 2A and a cylinder lower chamber 2B. The piston 5 is connected with one end of a piston rod 6 by a nut 7. The other end portion of the piston rod 6 extends through the cylinder upper chamber 2A and further through a rod guide 8 and an oil seal 9, which are fitted to the upper end portion of the double-tube structure comprising the cylinder 2 and the outer tube 3, and projects to the outside of the cylinder 2. A base valve 10 is provided in the lower end portion of the cylinder 2 to divide the cylinder lower chamber 2B and the reservoir 4 from each other.

The piston 5 is provided with passages 11 and 12 for communication between the cylinder upper and lower chambers 2A and 2B. The passage 12 is provided with a check valve 13 allowing only the flow of fluid from the cylinder lower chamber 2B toward the cylinder upper chamber 2A. The passage 11 is provided with a disk valve 14 opening when the pressure of fluid in the cylinder upper chamber 2A reaches a predetermined pressure to relieve the fluid pressure to the cylinder lower chamber 2B.

The base valve 10 is provided with passages 15 and 16 for communication between the cylinder lower chamber 2B and the reservoir 4. The passage 15 is provided with a check valve 17 allowing only the flow of fluid from the reservoir 4 toward the cylinder lower chamber 2B. The passage 16 is provided with a disk valve 18 opening when the pressure of fluid in the cylinder lower chamber 2B reaches a predetermined pressure to relieve the fluid pressure to the reservoir 4. A hydraulic oil is sealed in the cylinder 2 as a hydraulic fluid, and the hydraulic oil and a gas are sealed in the reservoir 4.

The cylinder 2 has a separator tube 20 fitted thereover with seal members 19 interposed therebetween at the upper and lower ends of the cylinder 2. An annular passage 21 is formed between the cylinder 2 and the separator tube 20. The annular passage 21 is communicated with the cylinder upper chamber 2A through a passage 22 provided in a side wall of the cylinder 2 near the upper end thereof. A circular cylindrical connecting member 23 is attached to a lower part of the separator tube 20. The connecting member 23 projects sideward and is open at both ends thereof. The side wall of the outer tube 3 is provided with a large-diameter opening 24 in substantially concentric relation to the connecting member 23. A damping force generating mechanism 25 is attached to the opening 24 of the side wall of the outer tube 3.

Next, the damping force generating mechanism 25 will be explained with reference mainly to FIG. 1.

Figure 1:
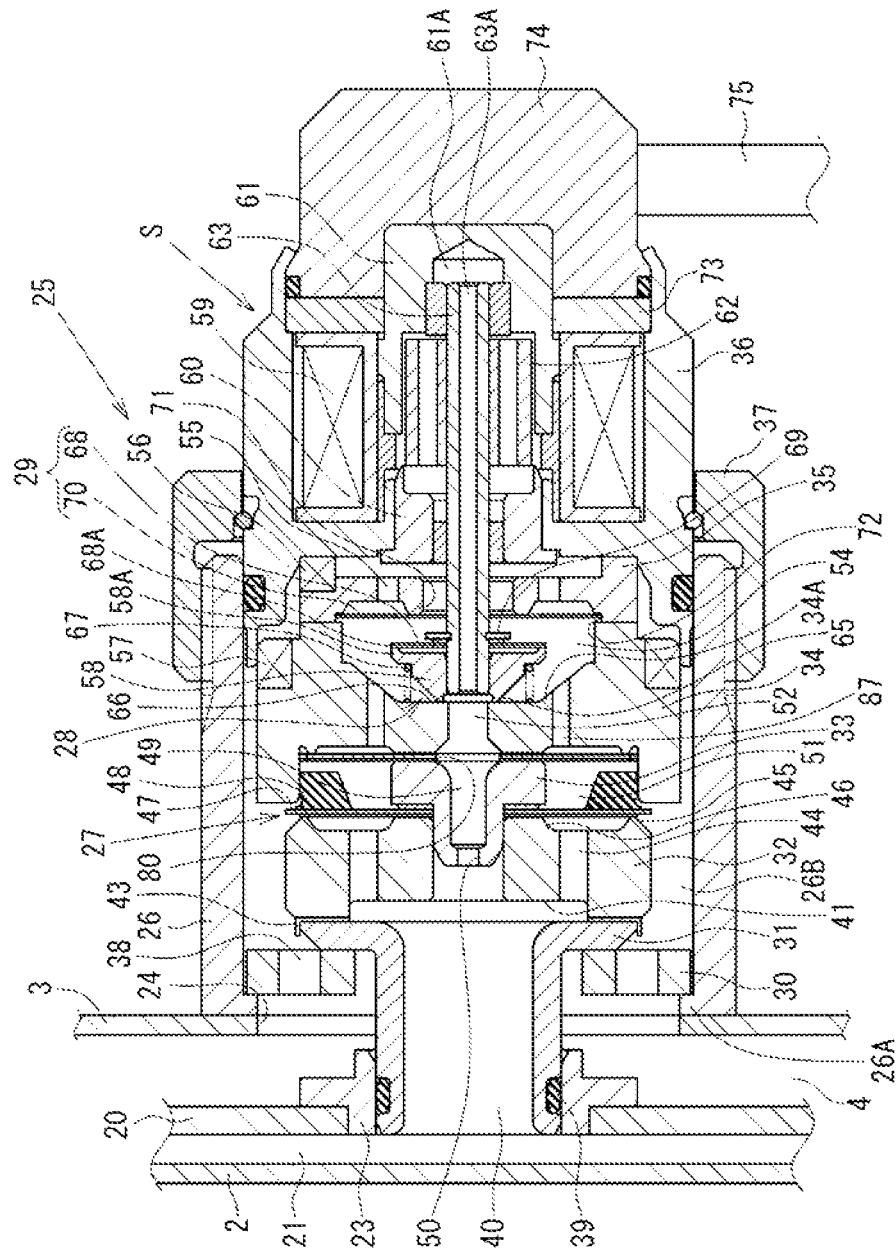
FIG. 1 is an enlarged longitudinal sectional view of a damping force generating mechanism, which is a main part of a damping force control type shock absorber according to one embodiment of the present invention.

As shown in FIG. 1, the damping force generating mechanism 25 has a circular cylindrical casing 26 attached to the opening 24 of the outer tube 3. The cylindrical casing 26 is provided therein with a pilot-type (back-pressure type) main valve 27 and a pilot valve 28, which is a solenoid-driven pressure control valve controlling the valve-opening pressure of the main valve 27. The damping force generating mechanism 25 further has a fail-safe valve 29 provided downstream of the pilot valve 28. The fail-safe valve 29 operates when there is a failure.

The casing 26 contains, in order from the opening 24 side thereof, an annular passage plate 30, a convex passage member 31, an annular main valve member 32, a convex orifice passage member 33, a circular cylindrical pilot valve member 34 having a bottom in the middle thereof, an annular retaining member 35, and a circular cylindrical solenoid casing 36. These members are disposed to abut against one another and secured by connecting the solenoid casing 36 to the casing 26 by a nut 37.

The passage plate 30 is secured in abutting contact with an inner flange 26A formed on the end portion of the casing 26. The passage plate 30 has a plurality of passages 38 axially extending therethrough to communicate between the reservoir 4 and a chamber 26B in the casing 26. The passage member 31 has a small-diameter distal end portion and a large-diameter shoulder portion. The small-diameter distal end portion extends through the passage plate 30. The large-diameter shoulder portion abuts against the passage plate 30. In this way, the passage member 31 is secured. The distal end portion of the passage member 31 is fitted to the connecting member 23 of the separator tube 20. The distal end portion of the passage member 31 and the connecting member 23 have respective fitting portions. These fitting portions are sealed with a seal member 39, and a passage 40 axially extending through the passage member 31 communicates with the annular passage 21.

The main valve member 32 is secured with one end portion thereof abutting against the large-diameter shoulder portion of the passage member 31. A seal member 43 seals between the mutually abutting portions of the main valve member 32 and the passage member 31. The main valve member 32 is provided with a plurality of circumferentially spaced passages 44 axially extending therethrough. The passages 44 communicate with the passage 40 of the passage member 31 through an annular recess 41 formed on one end of the main valve member 32. The other end of the main valve member 32 has an annular seat portion 45 projecting at the outer peripheral side of the openings of the passages 44. Further, the other end of the main valve member 32 has an annular clamp portion 46 projecting at the inner peripheral side of the openings of the passages 44.

The outer peripheral portion of a disk valve 47 constituting the main valve 27 seats on the seat portion 45 of the main valve member 32. The inner peripheral portion of the disk valve 47 is clamped between the clamp portion 46 and a large-diameter shoulder portion of the orifice passage member 33. An annular sliding seal member 48 is secured to the outer peripheral portion of the rear side of the disk valve 47. The convex orifice passage member 33 has a small-diameter portion and a large-diameter shoulder portion. The small-diameter portion of the orifice passage member 33 is inserted into an opening in the center of the main valve member 32. The large-diameter shoulder portion of the orifice passage member 33 abuts against the disk valve 47. In this way, the orifice passage member 33 is secured. The orifice passage member 33 has a passage 49 axially extending therethrough. The passage 49 communicates with the passage 40 of the passage member 31 through a fixed orifice 50 formed in the distal end portion of the small-diameter portion of the orifice passage member 33.

The pilot valve member 34 has a substantially circular cylindrical configuration having a bottom 34A in the middle thereof. One end of the bottom 34A of the pilot valve member 34 abuts against the orifice passage member 33 through a flexible disk member 53, which will be detailed later.

The pilot valve member 34 has a circular cylindrical portion at one end thereof. The sliding seal member 48 of the disk valve 47 is slidably and fluid-tightly fitted to the inner peripheral surface of the cylindrical portion of the pilot valve member 34, thereby forming a pilot chamber 51 at the back of the disk valve 47. The disk valve 47 opens upon receiving the pressure in the passage 44 to communicate the passages 44 with the chamber 26B in the casing 26, which is downstream of the disk valve 47. The pressure in the pilot chamber 51 acts on the disk valve 47 in the direction for closing the disk valve 47. The bottom 34A of the pilot valve member 34 has a central portion. A port 52 extends through the central portion of the bottom 34A. The port 52 communicates with the passage 49 of the orifice passage member 33.

Figure 3:
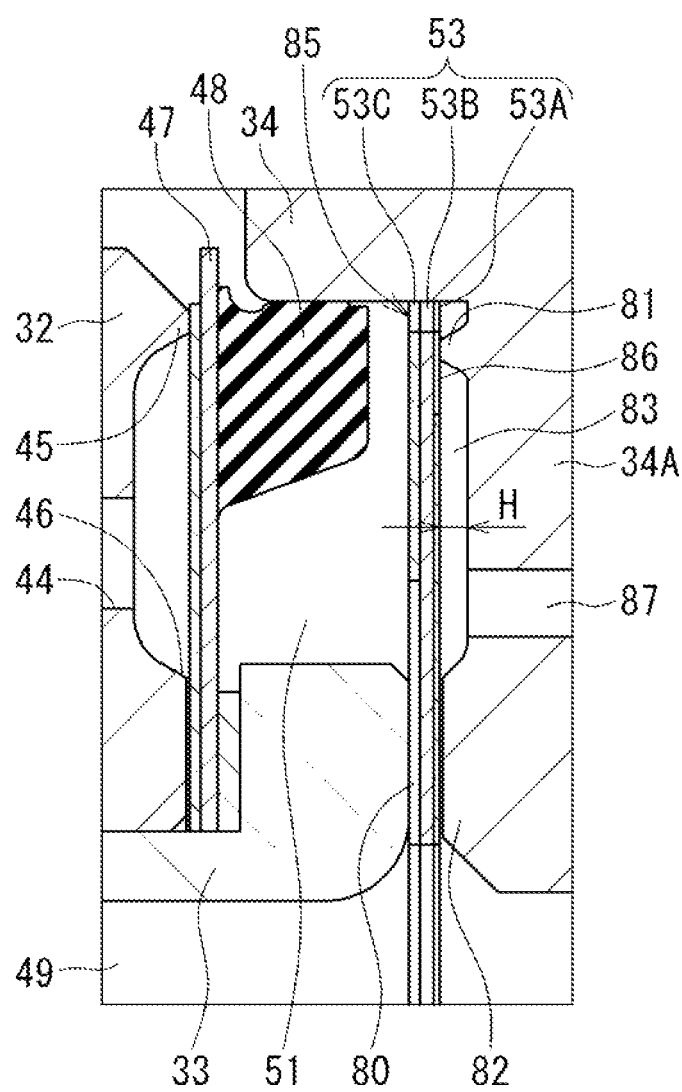
FIG. 3 is an enlarged view of a pilot chamber of the damping force generating mechanism shown in FIG. 1.
Figure 4:
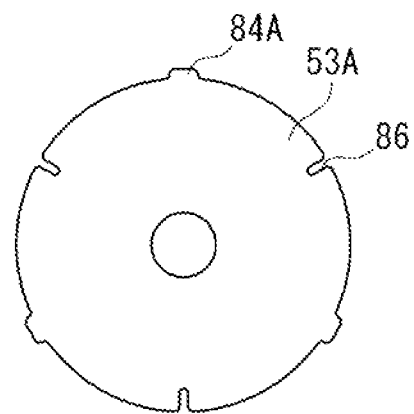
FIG. 4 is a plan view of a disk with cut portions of the damping force generating mechanism shown in FIG. 1.
Figure 5:
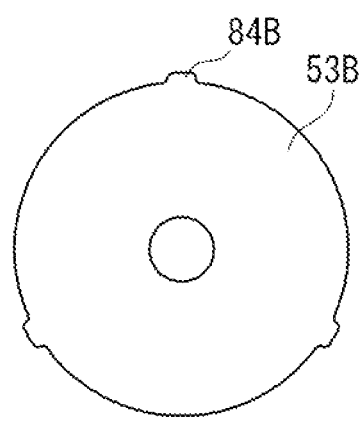
FIG. 5 is a plan view of a plain disk of the damping force generating mechanism shown in FIG. 1.
Figure 6:
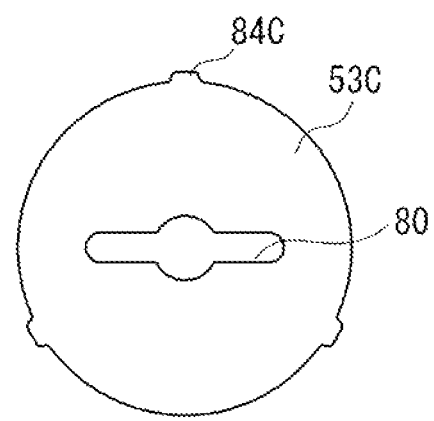
FIG. 6 is a plan view of a slotted disk of the damping force generating mechanism shown in FIG. 1.

As shown in FIG. 3, a flexible disk member 53 is clamped between the orifice passage member 33 and the bottom 34A f the pilot valve member 34. The flexible disk member 53 comprises three annular seat members 53A, 53B and 53C stacked over one another as will be detailed later. The pilot chamber 51 communicates with the passage 49 of the orifice passage member 33 through a radial slot 80 (see also FIG. 6) formed in the seat member 53C abutting against the orifice passage member 33. The slot 80 constitutes an inlet passage introducing the hydraulic oil into the pilot chamber 51.

The retaining member 35 is secured with one end thereof abutting against the end of a circular cylindrical portion of the other end of the pilot valve member 34. Thus, a valve chamber 54 is formed inside the cylindrical portion of the pilot valve member 34. A circular cylindrical portion of the solenoid casing 36, which is fitted in the casing 26, is fitted to the respective outer peripheral portions of the pilot valve member 34 and the retaining member 35, thereby radially positioning the pilot valve member 34 and the retaining member 35.

The valve chamber 54 communicates with the chamber 26B in the casing 26 through a passage 55 axially extending through the retaining member 35 and a cut portion 56 formed in the outer peripheral portion of the retaining member 35 and further through a cut portion 57 formed in the outer peripheral portion of the pilot valve member 34.

The valve chamber 54 is provided therein with a valve body 58 of the pilot valve 28. The pilot valve 28 is a pressure control valve selectively opening and closing the port 52. The port 52 constitutes a pilot passage communicating between the pilot chamber 51 and the downstream side of the disk valve 47.

The solenoid casing 36 contains a coil 59, cores 60 and 61 inserted in the coil 59, a plunger 62 guided by the cores 60 and 61, and a hollow actuating rod 63 connected to the plunger 62. These members are secured by fitting an annular spacer 73 and a cup-shaped cover 74 to the rear end portion of the solenoid casing 36 by staking or caulking the rear end portion of the solenoid casing 36.

The coil 59, the cores 60 and 61, the plunger 62 and the actuating rod 63 constitute a solenoid actuator S. The distal end portion of the actuating rod 63 extends through the retaining member 35 and is connected to the valve body 58 in the valve chamber 54. When the coil 59 is supplied with an electric current through a lead wire 75, axial thrust is generated in the plunger 62 according to the supplied electric current.

The valve body 58 has a tapered distal end portion that faces the port 52 of the pilot valve member 34. An annular seat portion 65 is formed on the tapered distal end portion of the valve body 58. The seat portion 65 selectively unseats from and seats on a seat surface 66 around the port 52, thereby opening and closing the port 52.

The valve body 58 is urged by the spring force of a valve spring 67 (compression coil spring) serving as an urging member. The valve body 58 is normally at a retract position closer to the retaining member 35 to open the port 52. The valve spring 67 is interposed between the valve body 58 and the bottom 34A of the pilot valve member 34.

When the coil 59 is energized, thrust generated in the plunger 62 causes the valve body 58 to advance against the spring force of the valve spring 67. Consequently, the seat portion 65 of the valve body 58 seats on the seat surface 66 to close the port 52.

The pressure in the port 52, i.e. the pressure in the pilot chamber 51, can be controlled by adjusting the valve-opening pressure through the thrust of the plunger 62, i.e. the electric current supplied to the coil 59.

The valve body 58 has a hollow actuating rod 63 extending therethrough. When the valve body 58 is in a valve closing position, i.e. when the seat portion 65 seats on the seat surface 66, a passage 63A in the actuating rod 63 opens into the port 52 to communicate between the port 52 and a chamber 61A in the core 61 at the back of the actuating rod 63, thereby reducing the pressure-receiving area of the valve body 58 with respect to the port 52 to reduce the load on the solenoid actuator S.

The following is an explanation of the fail-safe valve 29.

The fail-safe valve 29 has an annular seat disk 68 and an annular fail-safe disk 70.

The valve body 58 has an annular seat portion 58A projecting from the outer periphery of the rear end surface thereof. At least one annular seat disk 68, i.e. either one annular seat disk 68 or a stack of a plurality of annular seat disks 68, abuts against the seat portion 58A. The seat disk 68 is secured to the valve body 58 with the inner peripheral portion thereof abutting against a snap ring 69 attached to the actuating rod 63.

An inner peripheral groove 72 is formed by the retaining member 35 and the pilot valve member 34. The annular fail-safe disk 70 has an outer peripheral portion. The outer peripheral portion of the fail-safe disk 70 is inserted into the inner peripheral groove 72, whereby the fail-safe disk 70 is floatingly supported so as to be axially movable by a predetermined distance. The outer peripheral edge portion of the seat disk 68 secured to the valve body 58 selectively unseats from and seats on the inner peripheral edge portion of the fail-safe disk 70, thereby opening and closing the flow path between the port 52 and the passage 55 in the valve chamber 54.

An orifice (cut portion) 68A is provided in the outer peripheral edge portion of the seat disk 68. The orifice 68A may be provided in the inner peripheral edge portion of the fail-safe disk 70.

The orifice 68A allows the port 52 and the passage 55 to be constantly communicated with each other even when the thrust of the plunger 62 is lost owing to a failure such as disconnection of the coil 59, a trouble in the in-vehicle controller, etc., and consequently the valve body 58 is retracted by the spring force of the valve spring 67, resulting in the seat disk 68 of the valve body 58 abutting against the fail-safe disk 70 to close the flow path between the port 52 and the passage 55 in the valve chamber 54, as will be explained later.

Thus, when the seat disk 68 abuts against the fail-safe disk 70, the port 52 and the passage 55 are constantly communicated with each other. If the valve chamber 54 is kept as a closed space, the damping force sharply rises undesirably when the fail-safe valve 29 opens afterward. The orifice 68A is provided to prevent this problem.

The retaining member 35 has a stopper 71 projecting therefrom to abut against the seat disk 68 to limit the retract position of the valve body 58. It should be noted that the stopper for limiting the retract position of the valve body 58 need not necessarily be provided or may be provided at other part. The retract position of the valve body 58 may be limited by abutment between the plunger 62 and the core 61.

When the coil 59 is unenergized, the valve body 58 is retracted by the spring force of the valve spring 67, and the seat disk 68 abuts against the fail-safe disk 70 to close the flow path between the port 52 and the passage 55 in the valve chamber 54. It should, however, be noted that, even in this state, the port 52 and the passage 55 are communicated with each other through the orifice 68A, as stated above. If, in this state, the pressure of fluid at the port 52 side in the valve chamber 54 rises to reach a predetermined pressure, the fail-safe disk 70 deflects, and the valve body 58 further retracts until the retract position of the valve body 58 is limited by the stopper 71. After the retract position of the valve body 58 has been limited by the stopper 71, the fail-safe disk 70 separates from the seat disk 68. Thus, a flow path is formed between the fail-safe disk 70 and the seat disk 68, and the flow path between the port 52 and the passage 55 opens.

When the coil 59 is energized, as shown in FIG. 1, the seat portion 65 of the valve body 58 is caused to seat on the seat surface 66 by the thrust of the solenoid actuator S against the spring force of the valve spring 67. During the pressure control executed by the pilot valve 28, the seat disk 68 is separate from the fail-safe disk 70 to provide communication through the flow path between the port 52 and the passage 55 in the valve chamber 54. In other words, while the seat portion 65 of the valve body 58 is separate from the seat surface 66 during the pressure control executed by the pilot valve 28, the flow path between the port 52 and the passage 55 in the valve chamber 54 is open.

Next, the structure of the pilot chamber 51 will be explained in more detail with reference mainly to FIG. 3.

As shown in FIG. 3, the pilot valve member 34 is a circular cylindrical casing member having a bottom 34A, which forms the pilot chamber 51. The bottom 34A of the pilot valve member 34 has an annular seat portion 81 projecting from an outer peripheral portion thereof, and an annular clamp portion 82 is formed to project from an inner peripheral portion of the bottom 34A to serve as a seat portion.

The above-described annular flexible disk member 53, which is a partition member, is disposed in the pilot chamber 51. The inner peripheral portion of the flexible disk member 53 is clamped between the clamp portion 82 of the pilot valve member 34 and the orifice passage member 33. The outer peripheral portion of the flexible disk member 53 is seated on the seat portion 81.

The outer peripheral-side seat portion 81 is higher in projecting height than the inner peripheral-side clamp portion 82. The flexible disk member 53 is seated on the seat portion 81 with a predetermined set load. Thus, an annular volume compensating chamber 83 is formed between the bottom 34A of the pilot valve member 34 and the flexible disk member 53. In other words, the volume compensating chamber 83 is defined by the flexible disk member 53, which is a partition member, so as to face the pilot chamber 51 across the flexible disk member 53. It should be noted that another annular seat portion may be provided at the outer periphery of the clamp portion 82.

The amount of deflection of the flexible disk member 53 is limited by the distance H between the disk member 53 and the bottom 34A of the pilot valve member 34. The bottom 34A functions as a stopper to prevent the flexible disk member 53 from being damaged by excessive deflection. It should be noted that a projection may be provided on the bottom 34A as a stopper so as to abut against the flexible disk member 53 to limit the amount of deflection of the disk member 53.

The flexible disk member 53 comprises three stacked seat members 53A, 53B and 53C. The seat members 53A, 53B and 53C each have three equally spaced projections 84A, 84B and 84C formed on the respective outer peripheries. The seat members 53A, 53B and 53C are diametrically positioned within the circular cylindrical space in the pilot chamber 51 to form arcuate gaps 85 between the flexible disk member 53 and the inner peripheral surface of the pilot chamber 51.

The seat member 53A, which abuts against the seat portion 81, has cut portions 86 formed on the outer periphery thereof. The pilot chamber 51 and the volume compensating chamber 83 are communicated with each other through the arcuate gaps 85 and the cut portions 86. Thus, the gaps 85 and the cut portions 86 form a gas-bleeding flow path. The cut portions 86 of the gas-bleeding flow path are designed to be very small in size so that the flow path area between the gaps 85 and the volume compensating chamber 83 is sufficiently small. The volume compensating chamber 83 is communicated with the valve chamber 54 through communicating passages 87 axially extending through the bottom 34A of the pilot valve member 34.

The seat member 53C, which abuts against the orifice passage member 33, is provided with a diametrically extending slot 80 joining with the opening in the center of the seat member 53C. The slot 80 provides communication between the passage 49 of the orifice passage member 33 and the pilot chamber 51. It should be noted that the gas-bleeding flow path is not an essential constituent element, although the provision thereof is desirable.

The following is an explanation of the operation of this embodiment arranged as stated above.

The damping force control type shock absorber 1 is installed between sprung and unsprung members of a suspension system of a vehicle. The lead wire 75 is connected to an in-vehicle controller or the like. In a normal operating state, the coil 59 is energized to seat the seat portion 65 of the valve body 58 on the seat surface 66 to execute pressure control by the pilot valve 28.

During the extension stroke of the piston rod 6, the movement of the piston 5 in the cylinder 2 closes the check valve 13 of the piston 5. Thus, before the disk valve 14 opens, the fluid in the cylinder upper chamber 2A is pressurized, and the pressurized fluid passes through the passage 22 and the annular passage 21 and flows into the passage 40 of the passage member 31 of the damping force generating mechanism 25 from the connecting member 23 of the separator tube 20.

At this time, an amount of fluid corresponding to the amount of movement of the piston 5 flows into the cylinder lower chamber 2B from the reservoir 4 by opening the check valve 17 of the base valve 10. It should be noted that when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive rise in pressure in the cylinder upper chamber 2A.

In the damping force generating mechanism 25, the fluid from the passage 40 of the passage member 31 flows as follows. Before the disk valve 47 of the main valve 27 opens (in the low piston speed region), the fluid passes through the fixed orifice 50 and the passage 49 of the orifice passage member 33 and the port 52 of the pilot valve member 34 and pushes open the valve body 58 of the pilot valve 28 to flow into the valve chamber 54. The fluid flowing into the valve chamber 54 further passes through the opening of the fail-safe disk 70 and flows into the reservoir 4 through the passage 55 and the cut portion 56 of the retaining member 35, the cut portion 57 of the pilot valve member 34, the chamber 26B in the casing 26 and the passages 38 of the passage plate 30. When the piston speed increases and the pressure in the cylinder upper chamber 2A reaches the valve-opening pressure of the disk valve 47, the fluid flowing into the passage 40 passes through the annular recess 41 and the passages 44 and pushes open the disk valve 47 to flow directly into the chamber 26B in the casing 26.

During the compression stroke of the piston rod 6, the movement of the piston 5 in the cylinder 2 opens the check valve 13 of the piston 5 and closes the check valve 17 for the passage 15 of the base valve 10. Thus, before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A into the reservoir 4 through a flow path similar to that during the above-described extension stroke. It should be noted that when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive rise in pressure in the cylinder lower chamber 2B.

Thus, during both the extension and compression strokes of the piston rod 6, before the disk valve 47 of the main valve 27 opens (in the low piston speed region) in the damping force generating mechanism 25, a damping force is generated by the fixed orifice 50 and the valve-opening pressure of the valve body 58 of the pilot valve 28. After the disk valve 47 has opened (in the high piston speed region), a damping force is generated according to the degree of opening of the disk valve 47. The damping force can be controlled directly, independently of the piston speed, by controlling the valve-opening pressure of the pilot valve 28 through the electric current supplied to the coil 59. In this regard, variation in the valve-opening pressure of the pilot valve 28 causes a change in the pressure in the pilot chamber 51 communicating with the passage 49 at the upstream side of the pilot valve 28. Because the pressure in the pilot chamber 51 acts in the direction for closing the disk valve 47, the valve-opening pressure of the disk valve 47 can be controlled simultaneously by controlling the valve-opening pressure of the pilot valve 28, and hence the damping force characteristic control range can be widened.

In addition, when the electric current supplied to the coil 59 is reduced to decrease the thrust of the plunger 62, the valve-opening pressure of the pilot valve 28 lowers, and soft damping force is generated. When the electric current supplied to the coil 59 is increased to increase the thrust of the plunger 62, the valve-opening pressure of the pilot valve 28 rises, and hard damping force is generated. Accordingly, soft damping force, which is generally used frequently, can be generated with a reduced electric current, and the power consumption can be reduced.

In the event that the thrust of the plunger 62 is lost owing to a failure such as disconnection of the coil 59, a trouble in the in-vehicle controller, etc., the valve body 58 is retracted by the spring force of the valve spring 67 to open the port 52. Further, the retraction of the valve body 58 causes the seat disk 68 of the valve body 58 to abut against the fail-safe disk 70 to close the flow path between the port 52 and the passage 55 in the valve chamber 54. In this state, the fluid in the valve chamber 54 flows from the port 52 to the passage 55 through the orifice 68A. The flow of the fluid is controlled by the fail-safe valve 29, i.e. the orifice 68A and the fail-safe disk 70. Thus, it is possible to generate a desired damping force and to control the pressure in the pilot chamber 51, i.e. the valve-opening pressure of the main valve 27, by setting the flow path area of the orifice 68A and the valve-opening pressure of the fail-safe disk 70. Consequently, an appropriate damping force can be obtained even in the event of a failure.

Thus, the passage for fluid when the coil 59 is energized and the fluid passage in the event of a failure are made common to each other (serialized). Therefore, the structure can be simplified, and the space efficiency can be increased. Further, the fail-safe disk 70 is a disk valve, and the passage for fluid in the event of a failure is selectively opened and closed by the disk valve and the end of the valve body. Therefore, productivity and assembleability can be increased in comparison to the arrangement using a ball valve, for example. In addition, soft damping force, which is generally used frequently, can be generated by supplying a reduced electric current to the coil 59. Accordingly, the power consumption can be reduced. When the coil 59 is unenergized, the fail-safe valve 29 provides an appropriate damping force larger than the soft damping force. Therefore, the vehicle steering stability can be ensured, and favorable fail-safe performance can be attained. It is also possible to prevent adverse effects, e.g. an increase in vibrations input to the vehicle body that may occur when the damping force characteristic is fixed to the hard damping force characteristic side.

The following is an explanation of the operation of the flexible disk member 53 provided in the pilot chamber 51 and the volume compensating chamber 83.

When the disk valve 47 opens, the volumetric capacity of the pilot chamber 51 reduces. At this time, the flexible disk member 53 deflects toward the volume compensating chamber 83 to compensate for the volumetric change in the pilot chamber 51, thereby suppressing an excessive rise in pressure in the pilot chamber 51. At this time, an amount of hydraulic oil corresponding to the reduction in the volume of the volume compensating chamber 83 is discharged toward the valve chamber 54 through the communicating passages 87. An excessive rise in pressure in the pilot chamber 51 causes the operation of the pilot valve 28 to be unstable, which, in turn, causes the pressure in the pilot chamber 51 to be unstable, thereby resulting in an unstable operation of the disk valve 47. Thus, the suppression of an excessive rise in pressure in the pilot chamber 51 enables suppression of the interaction between these adverse effects and allows a stable damping force to be obtained.

The flexible disk member 53 has a stacked structure comprising seat members 53A, 53B and 53C stacked over one another. Therefore, when the flexible disk member 53 deflects, a damping force generated by friction between the seat members 53A, 53B and 53C acts on the deflection of the disk member 53. Accordingly, it is possible to suppress abnormal vibration and to achieve stabilization of the operation.

In the pilot chamber 51, gas bubbles are likely to stay undesirably because no flow of hydraulic oil occurs therein. Conventional shock absorbers generally adopt a structure in which an orifice passage is provided in the top of the casing for a part where gas bubbles are likely to stay, to discharge gas bubbles to the reservoir (see, for example, Japanese Patent Application Publication No. 2009-243634). In this regard, in this embodiment, when the disk valve 47 is opened and closed, a slight flow of hydraulic oil occurs between the pilot chamber 51 and the volume compensating chamber 83, whereby gas bubbles in the pilot chamber 51 can be moved into the volume compensating chamber 83 through the cut portions 86 of the seat member 53A of the flexible disk member 53 and discharged toward the valve chamber 54 through the communicating passages 87. Thus, the gas bubbles can be discharged from the pilot chamber 51 simply by providing the cut portions 86 in the seat member 53A, without the need to bore the pilot valve member 34.

The arrangement may be as follows. The cut portions 86 of the seat member 53A are omitted, or the seat member 53A itself is omitted, and the gas bubbles are moved from the pilot chamber 51 to the volume compensating chamber 83 through the area of abutting contact between the flexible disk member 53 and the seat portion 81 (the area of abutting contact between the flexible disk member 53 and the seat portion 81 forms a gas-bleeding flow path having sufficient sealability against liquids but being somewhat permeable to gases).

Although in the foregoing embodiment the pilot valve 28 controls the pressure in the pilot chamber 51 by being actuated by the solenoid actuator S, the present invention is not limited thereto. The pilot valve may be a control valve actuated by an actuator to control the flow path area of the pilot passage. Alternatively, the pilot valve may be a control valve, e.g. a disk valve, associated with a spring member so as to open at a predetermined pressure, without using an actuator.

Although in the foregoing embodiment the damping force generating mechanism 25 is provided at the side of the cylinder 2, the damping force generating mechanism may be provided in any place where a flow of hydraulic fluid is induced by sliding movement of the piston, for example, in the piston part.

Although in the foregoing embodiment the flexible disk member 53 is used as the partition member by way of example, the present invention is not limited thereto. The partition member may be a non-deflectable annular disk that is pressed from the back by a spring or a rubber member. The disk valve 47 may also be a non-deflectable disk valve that is urged by a coil spring.

Although in the foregoing embodiment the volume compensating chamber 83 is connected to the reservoir 4 through the communicating passages 87, the present invention is not limited thereto. The arrangement may be such that the rear surface of the flexible disk member 53 is open directly to the reservoir or to the downstream-side chamber.

Although in the foregoing embodiment the shock absorber is a hydraulic shock absorber by way of example, the fluid used in the shock absorber is not limited to oil but may be water, for example.

The shock absorber according to the foregoing embodiment can obtain stable damping force.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-291189 filed on Dec. 22, 2009.

The entire disclosure of Japanese Patent Application No. 2009-291189 filed on Dec. 22, 2009 including specification, claims, drawings and summary is incorporated herein by reference in its entirety.

What is claimed is:

1. A shock absorber comprising:
a cylinder having a fluid sealed therein;
a piston slidably fitted in the cylinder;
a piston rod connected at one end thereof to the piston, an other end of the piston rod extending to an outside of the cylinder;
a main valve generating a damping force by a flow of fluid induced by sliding movement of the piston;
a pilot chamber applying a pressure therein to the main valve in a direction for closing the main valve;
an inlet passage introducing the fluid into the pilot chamber;
a pilot passage communicating between the pilot chamber and a downstream side of the main valve; and
a pilot valve provided in the pilot passage to discharge the fluid from the pilot chamber;
the shock absorber further comprising:
a partition member provided in the pilot chamber to form a volume compensating chamber facing the pilot chamber across the partition member, the volume compensating chamber being communicated with the downstream side of the main valve.

2. The shock absorber of claim 1, wherein the pilot valve is a control valve actuated by a solenoid actuator.

3. The shock absorber of claim 1, wherein the partition member has a flexible disk member;
the pilot chamber being formed by a cylindrical casing member having a bottom;
the volume compensating chamber being defined by the flexible disk member seated on at least two annular seat portions projecting from inner and outer peripheral portions, respectively, of the bottom of the casing member;
a communicating passage being formed in the bottom of the casing member.

4. The shock absorber of claim 2, wherein the partition member has a flexible disk member;
the pilot chamber being formed by a cylindrical casing member having a bottom;
the volume compensating chamber being defined by the flexible disk member seated on at least two annular seat portions projecting from inner and outer peripheral portions, respectively, of the bottom of the casing member;
a communicating passage being formed in the bottom of the casing member.

5. The shock absorber of claim 3, wherein the flexible disk member is clamped at an inner peripheral portion thereof by the seat portion projecting from the inner peripheral portion of the bottom of the casing member.

6. The shock absorber of claim 4, wherein the flexible disk member is clamped at an inner peripheral portion thereof by the seat portion projecting from the inner peripheral portion of the bottom of the casing member.

7. The shock absorber of claim 3, wherein a stopper is provided downstream of the flexible disk member to limit an amount of deflection of the flexible disk member.

8. The shock absorber of claim 4, wherein a stopper is provided downstream of the flexible disk member to limit an amount of deflection of the flexible disk member.

9. The shock absorber of claim 3, wherein a gas-bleeding flow path is formable between the flexible disk member and the seat portion projecting from the outer peripheral portion of the bottom of the casing member;
the gas-bleeding flow path allowing gas bubbles staying in the pilot chamber to move to the volume compensating chamber through the gas-bleeding flow path.

10. The shock absorber of claim 4, wherein a gas-bleeding flow path is formable between the flexible disk member and the seat portion projecting from the outer peripheral portion of the bottom of the casing member;
the gas-bleeding flow path allowing gas bubbles staying in the pilot chamber to move to the volume compensating chamber through the gas-bleeding flow path.

* * * * *